Figure 1:
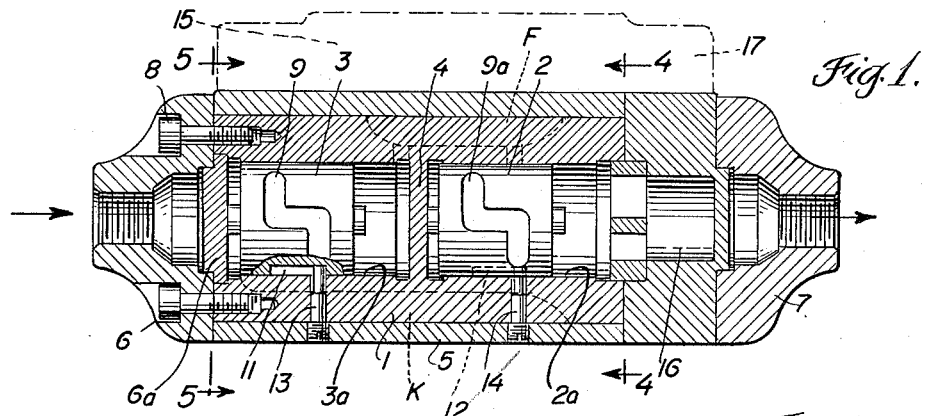

Sept. 26, 1961  P. DE GRAAF  3,001,400
FLUID METERS
Filed March 24, 1960  6 Sheets-Sheet 1

INVENTOR
Pieter de Graaf
BY
Wenderoth, Lind & Ponack
ATTORNEYS

Sept. 26, 1961   P. DE GRAAF   3,001,400
FLUID METERS
Filed March 24, 1960   6 Sheets-Sheet 2

INVENTOR
Pieter de Graaf
BY
Wenderoth, Lind & Ponack
ATTORNEYS

Sept. 26, 1961 P. DE GRAAF 3,001,400
FLUID METERS
Filed March 24, 1960 6 Sheets-Sheet 3
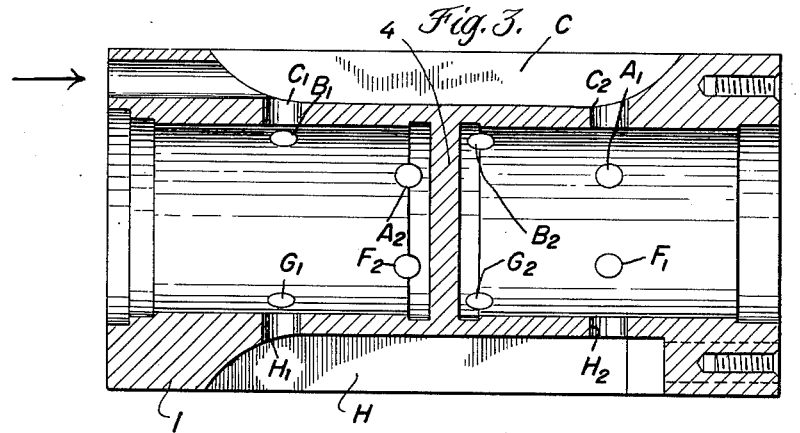
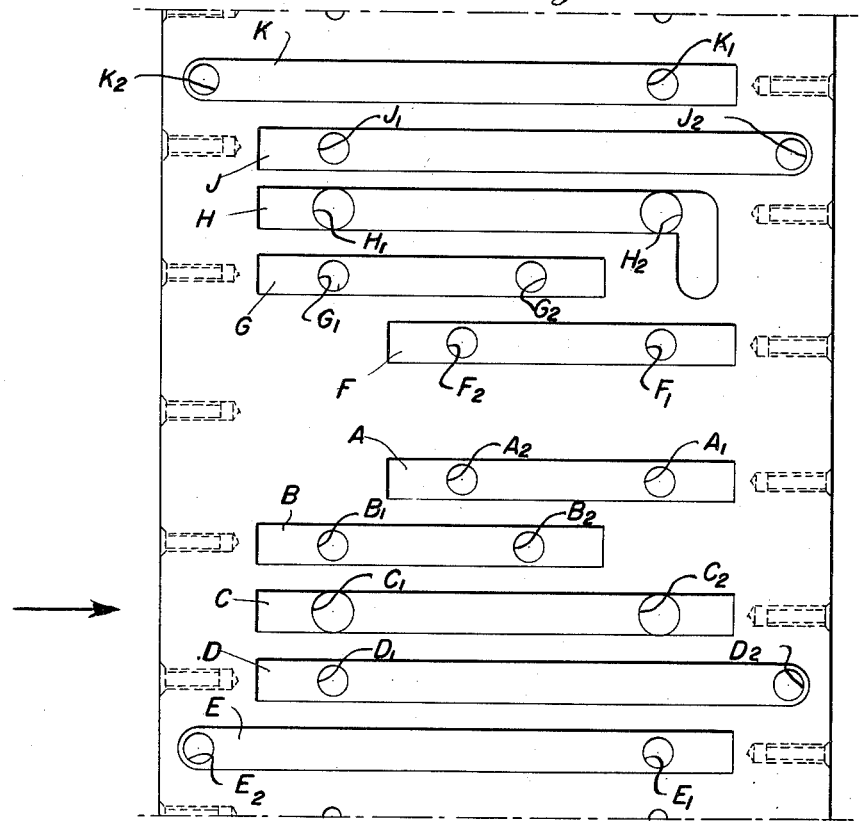

Sept. 26, 1961 P. DE GRAAF 3,001,400
FLUID METERS
Filed March 24, 1960 6 Sheets-Sheet 4

INVENTOR
Pieter de Graaf
BY
Wenderoth, Lind & Ponack
ATTORNEYS

Sept. 26, 1961 P. DE GRAAF 3,001,400
FLUID METERS
Filed March 24, 1960 6 Sheets-Sheet 5

INVENTOR
Pieter de Graaf
BY
Wenderoth, Lind & Ponack
ATTORNEYS

Sept. 26, 1961 P. DE GRAAF 3,001,400
FLUID METERS
Filed March 24, 1960 6 Sheets-Sheet 6
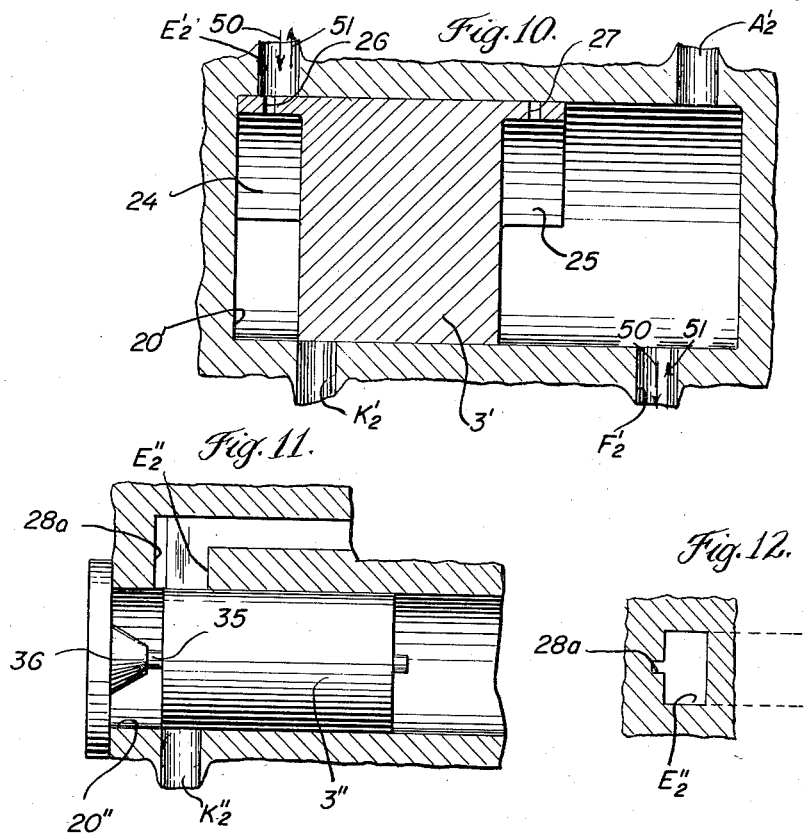
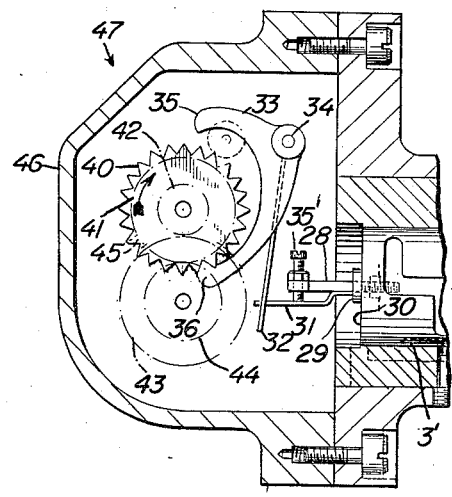
INVENTOR
Pieter de Graaf
BY
Wenderoth, Lind & Ponack
ATTORNEYS

United States Patent Office 3,001,400
Patented Sept. 26, 1961

3,001,400
FLUID METERS
Pieter de Graaf, Dordrecht, Netherlands, assignor to N.V. Vloeistofmeetapparatenfabriek, Rotterdam, Netherlands
Filed Mar. 24, 1960, Ser. No. 17,315
8 Claims. (Cl. 73—242)

The present invention is a continuation-in-part of the apparatus shown in my Patent 2,938,382 granted May 31, 1960, entitled "Fluid Meters." It is also an improvement of the apparatus shown in German Patent No. 8323 dated June 25, 1879.

The primary object of the invention is to provide a very reliable meter of simple and compact construction and long life.

A further object of the invention is to provide a construction comprising a housing, pistons adapted to be reciprocated in said housing, measuring chambers at both sides of said pistons, means for preventing rotation of said pistons in said housing, said pistons being mutually free from mechanical interconnection and being movable by fluid periodically supplied to their opposite surfaces, fluid-carrying conduits in the housing, the fluid through said conduits being controlled by control slots provided in the piston bodies in the circumference thereof and being so arranged that the measuring chambers at both sides of each piston are alternately in connection either with the inlet for the supply of fluid or with the outlet for the discharge of fluid, each piston acting as a fluid distributing piston valve for the other piston.

A still further object is to provide a meter which has no diaphragms, springs or similar delicate and vulnerable parts and in which there is no mechanical coupling means between the pistons in order to promote simplicity. Furthermore, there is no dead point in the movement of the pistons, so that no positions occur in which there would be no positive action of the fluid on a piston.

The pistons may be of very simple construction. They may be formed of a single part or several parts which however need not at all be mutually movable. However, then, it is to be recommended that the piston is braked at the end of its stroke to prevent knocking. This may be simply achieved by providing outlet ports in the meter housing so that they will be throttled during the braking path of the pistons. When in such meters the piston velocities become low, such as at supplies of 5 or 10% of the full capacity, the danger exists that a piston will reach the position wherein it cuts off the fluid supply to the other piston before said other piston completes its stroke, so that the result of the measuring will be incorrect. An object of the invention is to provide means which effect that the pistons in this meter-type, which offers advantages such as a compact and simple structure, will perform their full stroke under all circumstances.

A still further object is to provide a construction wherein each piston is provided with or cooperates with means for making the piston initially move slowly so that the other piston can complete its stroke. Since the inertia of the piston is no more of importance for obtaining complete strokes, the invention offers the extra advantage that the pistons may be very light.

Figure 2:
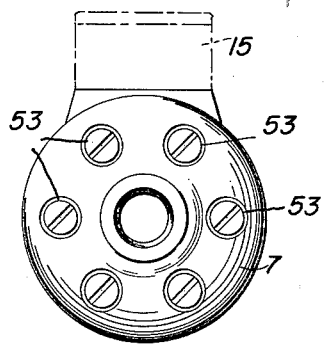
Figure 4:
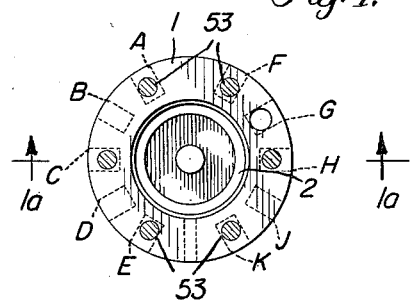
Figure 6:
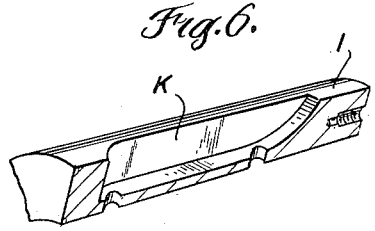
Figure 5:
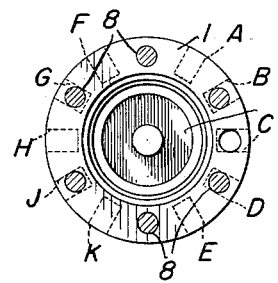
Figure 1A:
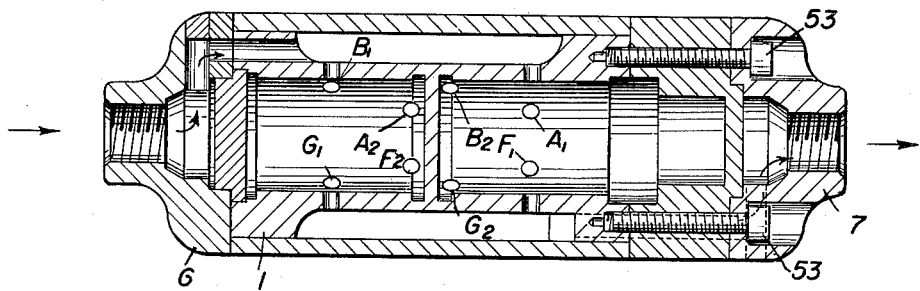
Figure 13A:
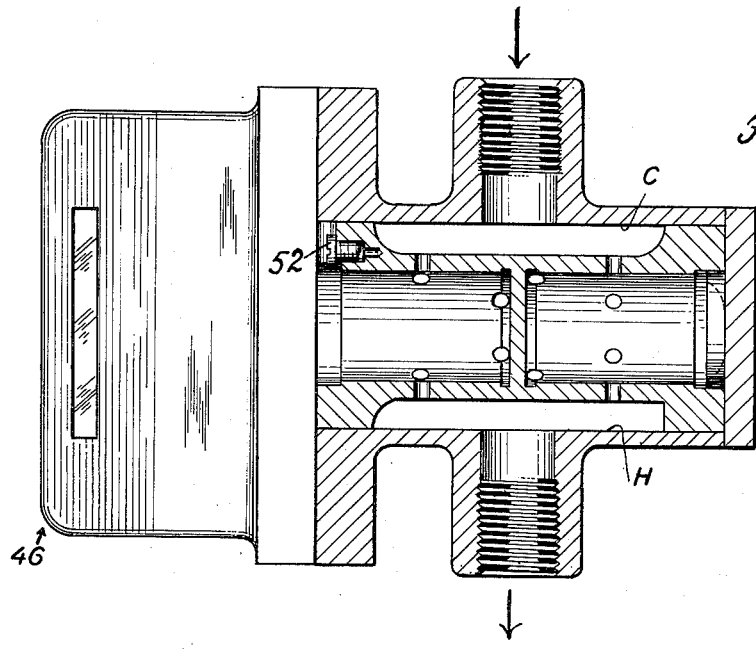
Figure 7:
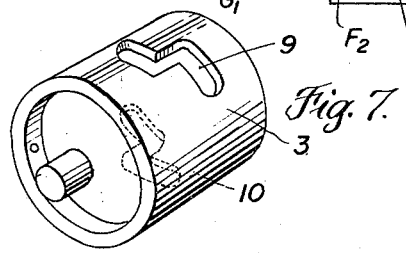

With the above and other objects in view which will become apparent from the description detailed below some modifications of the invention are shown in the drawings in which:

FIGURE 1 is a longitudinal section of the meter;
FIGURE 1a is a cross-sectional view taken along section line 1a—1a in FIGURE 4.
FIGURE 2 is an end view from the right of FIGURE 1.
FIGURE 3 illustrates the location of some conduits in a longitudinal section of the meter housing;
FIGURE 3a is a development of the circumference of the housing according to FIGURE 3;
FIGURE 4 is a view on section line 4—4 of FIGURE 1 looking in the direction of the arrows;
FIGURE 5 is a view on section line 5—5 of FIGURE 1 looking in the direction of the arrows;
FIGURE 6 is a perspective view illustrating the shape of one of the passages in the housing;
FIGURE 7 shows a perspective view of a piston;
FIGURES 8a, 8b, 8c and 8d show schematically the fluid flow for different positions of the pistons;
FIGURE 9 is a graph showing the speed of a piston in relation to time;
FIGURES 10 and 11 illustrate schematically two embodiments for making the piston initially move at a slow velocity;
FIGURE 12 is a fragmentary view of part of FIGURE 11;
FIGURE 13 is a cross-sectional view with parts in elevation showing a modification of the metering device of FIGURE 1 with the drive mechanism for a counter attached, and
FIGURE 13a is a top view of the construction shown in FIGURE 13 with parts in cross-section.

FIGURE 1 shows the complete meter illustrating how very simple and compact such a meter can be built. This meter is furthermore such that the flow direction of the fluid is never reversed in the various fluid-carrying conduits. The advantage thereof is that no substantial impulses or knocks can occur in the conduits.

In FIGURE 1 a cylindrical meter housing 1 is provided with fluid-carrying conduits to be described more in detail. Two pistons 2 and 3, which are not mechanically interconnected can reciprocate in the cylinders 2a and 3a at both sides of the partition wall 4.

The housing 1 is surrounded by a cylinder 5, which delimits fluid-carrying conduits or passages in the housing 1. The ends of the housing 1 are closed by end covers 6 and 7, secured by screw 8, and the fluid enters through cover 6 and is delivered through cover 7. The disk-like piece 6a delimits the cylinder 3a.

The pistons 2 and 3 are of very simple shape as appears from FIGURE 7. In their outer surface they are provided with S-shaped control slots 9 and 10, 9a and 10a respectively which constitute fluid-carrying passages and straight axial grooves 11 and 12, in which pointed screws 13 and 14 screwed in the house extend. Each control slot has the same construction, for example (FIGURE 8a), slot 9 has two axially spaced control slots 9b and 9c connected for fluid communication by a transverse channel 9d.

The grooves and screws serve to rectilinearly guide the pistons. This is necessary for a correct cooperation of the slots 9 and 10 with ports and conduits in the housing.

At 15 the place where a computer (counting device) might be mounted is indicated. This computer can be driven by a ratchet device or the like, which gets periodical impulses by means of a gearing when a piston moves from an end position near a cover 6 or 7 in the direction of the wall 4. Some part extending from the piston can then exert a force on the gearing and the ratchet device. The gearing can be mounted in the rooms 16 and 17 shown in FIGURE 1, which rooms are in communication.

According to FIGURES 3, 4 and 5, the housing 1 is provided with fluid-carrying conduits A, B, C, D, E, F, G, H, J and K. The conduits have different dimensions and shapes as is shown in the drawings and they occupy different places in longitudinal direction of the housing.

In FIGURE 3 the conduits C and H are shown. The conduit C is connected to the inlet of cover 6 and in effect forms part of the fluid inlet for the meter. The conduit H is connected to the outlet of the cover 7 and in effect forms a part of the fluid outlet for the meter.

FIGURE 3a represents how the conduits are situated in the housing and FIGURES 4 and 5 illustrate how the conduits are formed in radial direction of the housing. Each of the conduits is formed in the housing in a manner to have ports open to the cylinders as shown. The ports are labeled A-1, A-2, B-1, B-2, etc.

Figure 8A:
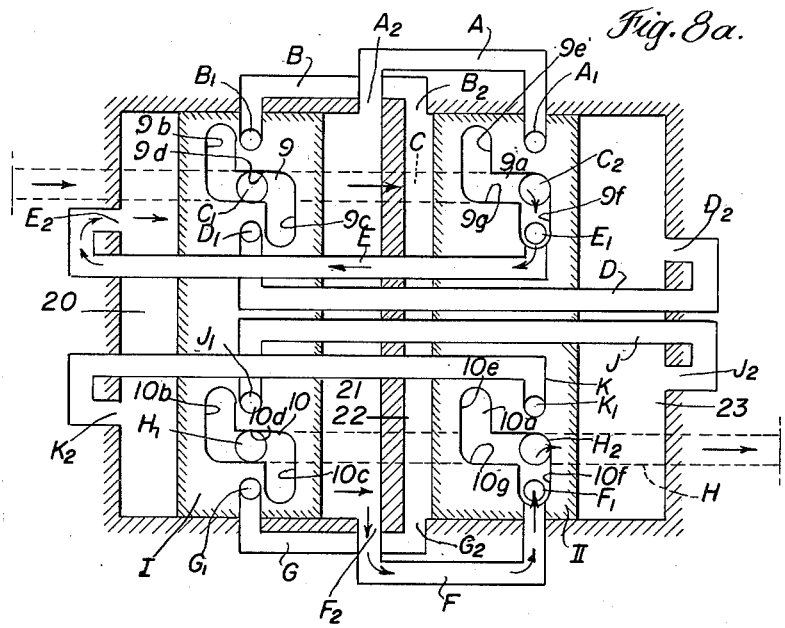
Figure 8B:
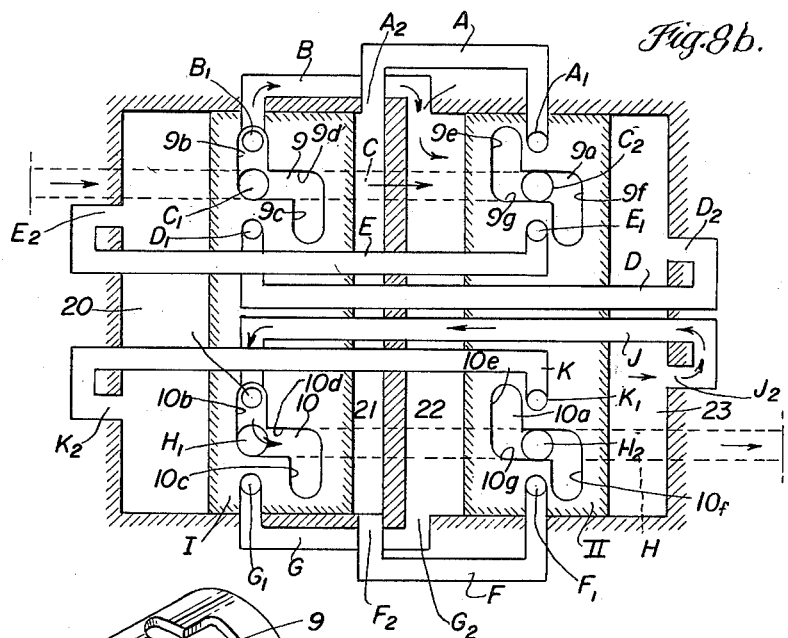
Figures 8C, 8D, 9:
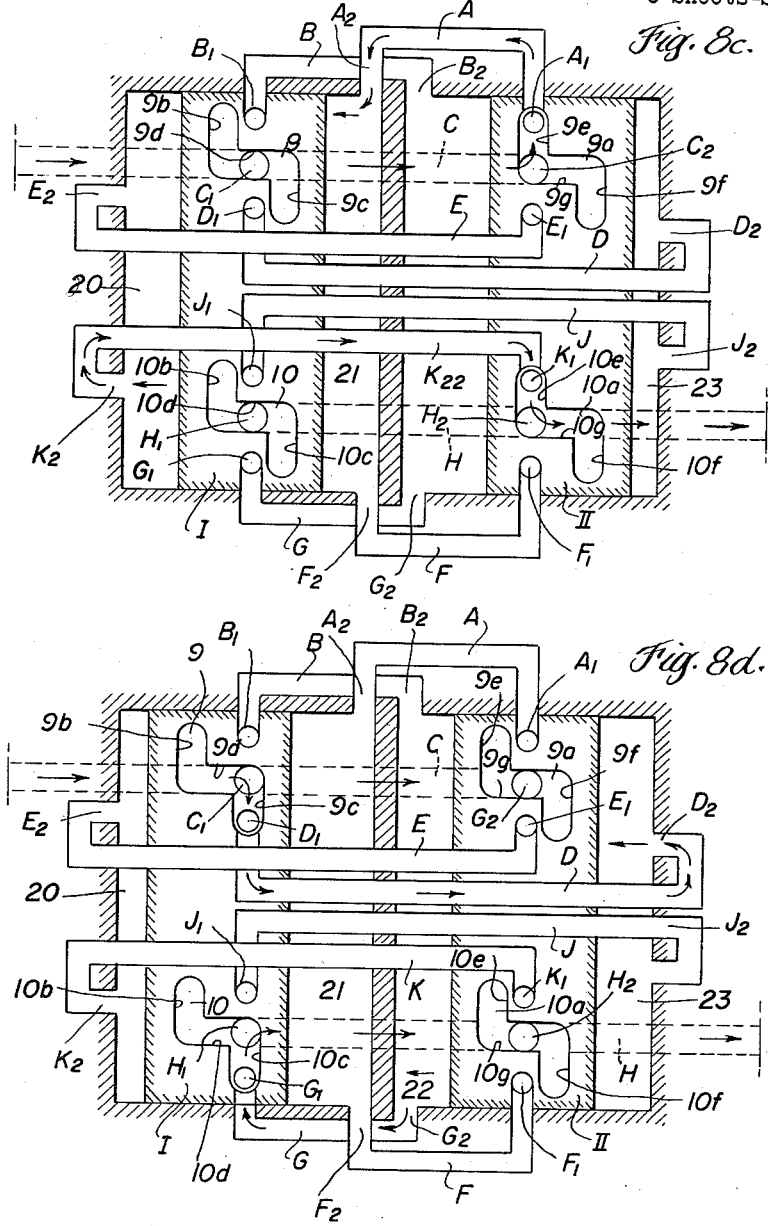

In the FIGURES 8a, b, c and d, all the conduits A to K inclusive are found again and shown in diagrammatical manner such that the fluid flow may be followed in four positions of the pistons. In each conduit the fluid always flows in the same direction.

In FIGURE 8a the piston I is moving to the right. The flow from the inlet is through conduit C, port C-2, slot 9f in piston II, port E-1, conduit E, port E-2 to measuring chamber 20. From measuring chamber 21 fluid is discharged through port F-2, conduit F, port F-1, slot 10f in piston II, port H-2 and conduit H.

Piston II is at the end of its inward stroke, but immediately gets an impulse from the left, when slot 9 comes in communication with port B-1 of conduit B (see FIGURE 8b) which leads fluid from inlet C, slot 9b, port B-1, conduit B, port B-2 and thence to measuring chamber 22.

At 23 a further measuring chamber is indicated. The further operation is evident when FIGURES 8b, c and d are considered in succession. The result is that the meter will always start to work in whatever position of the pistons.

At the end of their stroke throttle the discharge ports in the housing, such that the pistons will be braked and prevented from knocking.

According to FIGURE 10, at both sides of the piston 3' hood-shaped extensions 24 and 25 have been provided in which small ports 26 and 27 are bored.

In the position according to FIGURE 10, a prefilling is supplied through the port 26 from the port E-2' (connected to an inlet conduit such as E) to the measuring chamber 20'.

At the beginning of its stroke the piston moves very slowly (to the right) until the port E-2' is opened by displacement of the piston and the piston velocity increases.

The port F-2' (connected to an outlet conduit such as F) is open and is throttled only at the end of the piston stroke. For movement of the piston to the left, the port A-2' (connected to an inlet conduit such as A), the port 27 and the outlet port K-2' cooperate similarly as ports E-2', 26 and F-2'. The port K-2' is connected to an outlet conduit such as K.

The simple measure, namely the hood with the small prefill ports, appears to be sufficient to obtain the desired effect so that each piston always initially moves at a slow velocity whereby the other piston can complete its stroke.

According to FIGURES 11 and 12, the inlet port E-2" (connected to an inlet conduit such as E) is in section of rectangular form having a small extension 28a also forming an inlet port. The piston 3" together with the lug 35 abuts against the cylinder cover 36. The port 28a forms a prefill opening for the measuring chamber 20" in the abutting position so that the piston will at first move slowly increasing in velocity as the port E-2" is uncovered.

In FIGURE 13 which shows the drive mechanism for a counter positioned at one end of the meter, the inlet and the outlet are not shown as in FIGURE 1 but are located as shown by arrows in FIGURE 13a. FIGURE 13a is partly a top view and partly a horizontal sectional view of the device shown in FIGURE 13.

In FIGURE 13a the pistons have been omitted for the sake of clarity. In FIGURE 13 the piston connected with the drive is 3' and this piston corresponds to the piston 3 of FIGURE 1. In FIGURE 13 the inlet and outlet passages which are marked with arrows in FIGURES 3 and 3a have been omitted since the inlet and outlet are positioned laterally as shown in FIGURE 13a. Otherwise the device is unchanged. As shown in FIGURE 13a there is provided a screw 52 serving as an abutment for the piston 3' in its extreme left hand position. The space within the transparent casing 46 in FIGURE 13 constitutes one single space with the left hand measuring chamber of piston 3'. As is obvious the control mechanism shown in FIGURE 13 is therefore surrounded with fluid.

FIGURE 13 shows a drive mechanism for a counter. One of the pistons 3' is provided with an arm 28 which extends outwardly through a spider 29. In the position shown, the annular shoulder 30 on the piston abuts the spider. The arm 28 has fastened thereto a leaf spring 31. Through a hole in the leaf spring passes an arm 32 which is fastened to an escapement lever 33 pivotable about an axis 34. The angular movement of the arm 32 and the escapement lever 33 can be modified with respect to the stroke of the piston by means of the screw 35'. If the screw 35' is screwed back in the arm 28, the leaf spring 31 will move in an upward direction so that its distance to the axis 34 will become smaller which will reduce the angular movement of the arm 32 and lever 33 for any given distance of piston movement.

The escapement lever 33 is provided with two teeth 35 and 36 for cooperation with the teeth 40 of an escapement wheel 41 forcing the wheel to turn step by step in one direction. The escapement wheel 41 is provided with a gear wheel 42 meshing with a gear wheel 43. This gear wheel 43 has connected thereto a gear wheel 44 meshing with a gear wheel 45 revolving about the same axis as the escapement wheel 41. The gear wheel 45 is connected to drive a counter mechanism not shown. The counter mechanism may be of the typical type, i.e., having numeraled rollers which are rotated in accordance with the movement of the wheel 45. The numerals of the counter can be observed through the transparent casing 46 along the direction of the arrows 47. The casing 46 is fixed to the housing of the meter and is always filled with liquid. The advantage of this arrangement is that no moving parts have to be brought to the exterior of the casing which would require sealing means. Sealing means are undesirable because they would cause friction losses.

A slow movement of a piston at the beginning of its stroke can also be achieved by providing a flow restriction in the outlet, active during the first part of the stroke instead of such a restriction in the inlet, shown in FIGURES 10, 11 and 12. The design remains unchanged, but all the arrows in the figures are reversed, in other words inlet becomes outlet and vice versa.

In FIGURE 10 the arrows 50 indicate the flow when the flow restriction is provided at the inlet while the arrows 51 indicate the flow when the restriction is provided at the outlet.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. In a fluid meter: a housing formed with a fluid inlet and a fluid outlet and with first and second cylinders, the axes of the cylinders being substantially coaxial; two pistons respectively disposed in said cylinders for movement back and forth therein, the pistons and cylinders being constructed and arranged whereby measuring chambers are formed at the opposite ends of each of the cylinders; means for preventing rotation of the pistons; and for each piston, a first and a second pair of axially spaced slots formed on the piston each constituting a fluid passage, the first pair being arranged to receive fluid from said inlet and the second pair being arranged to transfer fluid to said outlet, fluid-carrying conduits in said housing respectively interconnecting said first pair of slots with the respective measuring chambers for the other piston in accordance with the position of the said piston to transfer fluid in a direction from a slot to a measuring chamber, fluid carrying conduits in said housing respectively interconnecting said second pair of slots with the respective measuring chambers for the other piston in accordance with the position of the said piston to transfer fluid in a direction from a measuring chamber to a slot; and for each of first said fluid carrying conduits, means forming a port providing, when the piston is at one end of a measuring chamber, for conducting fluid from the conduit to the measuring chamber and means forming a port of larger capacity than the first said port operative to also conduct fluid from the conduit to the measuring chamber in accordance with the movement of the piston.

2. In a fluid meter: a housing formed with a fluid inlet and a fluid outlet and with first and second cylinders, the axes of the cylinders being substantially coaxial; two pistons respectively disposed in said cylinders for movement back and forth therein, the pistons and cylinders being constructed and arranged whereby measuring chambers are formed at the opposite ends of each of the cylinders; means for preventing rotation of the pistons; for each piston, a first pair of axially spaced slots formed on the piston each constituting a fluid passage and adapted to move therewith, a pair of fluid-carrying conduits respectively connected to the measuring chambers for the other piston, a fluid-carrying inlet port connected to said inlet alternatively in communication with one or the other of said fluid-carrying conduits by way of one of said slots in accordance with the movement of the piston whereby fluid is transferred in a direction from the inlet port to a measuring chamber, a second pair of axially spaced slots formed on the piston and each constituting a fluid passage and adapted to move therewith, a second pair of fluid-carrying conduits respectively connected to the measuring chambers for the other piston, and a fluid-carrying outlet port connected to said outlet alternatively in communication with one or the other of said second fluid-carrying conduits by way of one of last said slots in accordance with the movement of the piston whereby fluid is transferred in a direction from a measuring chamber to the outlet port; and for each of first said fluid-carrying conduits, means forming a port providing, when the piston is at one end of a measuring chamber, for conducting fluid from the conduit to the measuring chamber and means forming a port of larger capacity than the first said port operative to also conduct fluid from the conduit to the measuring chamber in accordance with the movement of the piston.

3. In a fluid meter: a housing formed with a fluid inlet and a fluid outlet and with first and second cylinders, the axes of the cylinders being substantially co-axial; two pistons respectively disposed in said cylinders for movement back and forth therein, the pistons and cylinders being constructed and arranged whereby measuring chambers are formed at the opposite ends of the cylinders; means for preventing rotation of the pistons; for each piston, a first and a second control slot, each slot being formed on the piston by a pair of axially spaced passages connected for fluid communication by a transverse channel, the first control slot connected with said inlet and the second control slot connected with said outlet, fluid-carrying conduits in said housing respectively interconnecting said passages of said first slot with the respective measuring chambers for the other piston in accordance with the position of the said piston, and fluid-carrying conduits in said housing respectively inter-connecting said passages of said second slot with the respective measuring chambers for the other piston in accordance with the position of the said piston; and for each of first said fluid-carrying conduits, means forming a port providing, when the piston is at one end of a measuring chamber, for conducting fluid from the conduit to the measuring chamber and means forming a port of larger capacity than the first said port operative to also conduct fluid from the conduit to the measuring chamber in accordance with the movement of the piston.

4. In a fluid meter: a housing formed with a fluid inlet and a fluid outlet and with first and second cylinders, the axes of the cylinders being substantially coaxial; two pistons respectively disposed in said cylinders for movement back and forth therein, the pistons and cylinders being constructed and arranged whereby measuring chambers are formed at the opposite ends of the cylinders; means for preventing rotation of the pistons; for each piston, a first and a second control slot, each slot being formed in the piston by a pair of axially spaced passages connected for fluid communication by a transverse channel, a pair of fluid-carrying conduits in said housing, each having a port opening to the cylinder containing the piston, the ports lying substantially in the same radial plane and being respectively connectible with said first control slot in accordance with the movement of the piston, the conduits being respectively connected to the measuring chambers for the other piston and said fluid inlet being formed with a port opening to said cylinder and lying substantially in said plane and in communication with said first control slot for all operative positions of the piston, a second pair of fluid-carrying conduits in said housing each having a port open to said cylinder, the ports lying substantially in said plane and being respectively connectible with said second control slot in accordance with the movement of said piston, the conduits being respectively connected to the measuring chambers for the other piston and said fluid outlet being formed with a port open to said cylinder and lying substantially in said plane and in communication with said second control slot for all operative positions of the piston; and for each of first said fluid-carrying conduits, means forming a port providing, when the piston is at one end of a measuring chamber, for conducting fluid from the conduit to the measuring chamber and means forming a port of larger capacity than the first said port operative to also conduct fluid from the conduit to the measuring chamber in accordance with the movement of the piston.

5. In a fluid meter: a housing formed with a fluid inlet and a fluid outlet and with first and second cylinders, the axes of the cylinders being substantially coaxial; two pistons respectively disposed in said cylinders for movement back and forth, the pistons and cylinders being constructed and arranged whereby measuring chambers are formed at the opposite ends of each of the cylinders; for each piston, a first and a second control slot formed on the piston, each slot constituting a fluid passage, the first slot being in communication with said inlet and the second being in communication with said outlet, first fluid-carrying conduits in said housing inter-connecting said first slot with one or the other of the measuring chambers of the other piston in accordance with the movement of the said piston, second fluid-carrying conduits in said housing interconnecting said second slot with one or the other of the control chambers of the other piston in opposite relation to the connection made by said first fluid-carrying conduits and in accordance with the movement of the said piston; and for each of first said fluid-carrying conduits, means forming a port providing, when the piston is at one end of a measuring chamber, for conducting fluid from the conduit to the measuring chamber and means forming a port of larger capacity than the first said port operative to also conduct fluid from the conduit to the measuring chamber in accordance with the movement of the piston.

6. In a fluid meter: a housing formed with a fluid inlet and a fluid outlet and with first and second cylinders, the axes of the cylinders being substantially coaxial and both the inlet and the outlet being in fluid communication with both of said cylinders; two pistons, the first disposed in the first cylinder and the second disposed in the second cylinder for movement back and forth therein, the pistons and cylinders being constructed and arranged whereby inner and outer measuring chambers are formed respectively at the opposite ends of each of the cylinders; means for preventing rotation of the pistons; a first group of four fluid-carrying inlet conduits each respectively extending between a measuring chamber and the opposite cylinder, each conduit acting to transfer fluid to its associated measuring chamber; a second group of four fluid-carrying outlet conduits each respectively extending between a measuring chamber and the opposite cylinder, each conduit acting to transfer fluid from its associated measuring chamber; a first pair of fluid control slots formed on said first piston, one being adapted to interconnect, in accordance with the position of the first piston, said inlet with the first of said inlet conduits and the other to interconnect, in accordance with the position of the first piston, said outlet with the first of said outlet conduits whereby fluid is transferred respectively to and from the measuring chambers of the second cylinder to cause the second piston to move; a first pair of fluid control slots formed on said second piston, one being adapted to interconnect, in accordance with the position of the second piston, said inlet with the second of said inlet conduits and the other to interconnect in accordance with the position of the second piston, said outlet with the second of said outlet conduits whereby fluid is transferred respectively to and from the measuring chamber of the first cylinder to cause said first piston to move; a second pair of fluid control slots formed on said first piston, one being adapted to interconnect, in accordance with the position of the second piston, said with the third of said inlet conduits and the other to interconnect, in accordance with the position of the first piston, said outlet with the third of said outlet conduits whereby fluid is transferred respectively to and from the measuring chamber of the second cylinder to cause said second piston to move in a direction opposite to that of its first said movement; a second pair of fluid control slots formed on said second piston, one being adapted to interconnect, in accordance with the position of the second piston, said inlet with the fourth of said inlet conduits and the other to interconnect, in accordance with the position of the second piston, said outlet with the fourth of said outlet conduits whereby fluid is transferred respectively to and from the measuring chamber of the first cylinder to cause said first piston to move in a direction opposite that of its first said movement; and for each of first said fluid-carrying conduits, means forming a port providing, when the piston is at one end of a measuring chamber, for conducting fluid from the conduit to the measuring chamber and means forming a port of larger capacity than the first said port operative to also conduct fluid from the conduit to the measuring chamber in accordance with the movement of the piston.

7. In a fluid meter: a housing formed with a fluid inlet and a fluid outlet and with first and second cylinders, the axes of the cylinders being substantially coaxial; two pistons respectively disposed in said cylinders for movement back and forth therein, the pistons and cylinders being constructed and arranged whereby measuring chambers are formed at the opposite ends of each of the cylinders; means for preventing rotation of the pistons; and for each piston, a first and a second pair of axially spaced slots formed on the piston each constituting a fluid passage, the first pair being arranged to receive fluid from said inlet and the second pair being arranged to transfer fluid to said outlet, fluid-carrying conduits in said housing respectively interconnecting said first pair of slots with the respective measuring chambers for the other piston in accordance with the position of the said piston to transfer fluid in a direction from a slot to a measuring chamber, fluid carrying conduits in said housing respectively interconnecting said second pair of slots with the respective measuring chambers for the other piston in accordance with the position of the said piston to transfer fluid in a direction from a measuring chamber to a slot; and means for initially moving one piston slowly so that the other piston may keep its stroke.

8. In a fluid meter: a housing formed with a fluid inlet and a fluid outlet and with first and second cylinders, the axes of the cylinders being substantially coaxial; two pistons respectively disposed in said cylinders for movement back and forth therein, the pistons and cylinders being constructed and arranged whereby measuring chambers are formed at the opopsite ends of each of the cylinders; means for preventing rotation of the pistons; and for each piston, a first and a second pair of axially spaced slots formed on the piston each constituting a fluid passage, the first pair being arranged to receive fluid from said inlet and the second pair being arranged to transfer fluid to said outlet, fluid-carrying conduits in said housing respectively interconnecting said first pair of slots with the respective measuring chambers for the other piston in accordance with the position of the said piston to transfer fluid in a direction from a slot to a measuring chamber, fluid carrying conduits in said housing respectively interconnecting said second pair of slots with the respective measuring chambers for the other piston in accordance with the position of the said piston to transfer fluid in a direction from a measuring chamber to a slot; and means for restricting the fluid flow initially so that one piston will move slowly initially in order that the piston may complete its stroke.

References Cited in the file of this patent
UNITED STATES PATENTS

| | | |
|---|---|---|
| 88,475 | Harris | Mar. 30, 1869 |
| 1,912,687 | Brouse | June 6, 1933 |
| 2,938,382 | De Graaf | May 31, 1960 |